(12) United States Patent
Thomas et al.

(10) Patent No.: US 11,803,506 B2
(45) Date of Patent: Oct. 31, 2023

(54) PCIE ROUTING

(71) Applicant: Arm Limited, Cambridge (GB)

(72) Inventors: Tessil Thomas, Cambridge (GB); Anitha Kona, Austin, TX (US); Jacob Joseph, Rotherham (GB); Arthur Brian Laughton, Hathersage (GB); Nandakishore Sastry, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/512,758

(22) Filed: Oct. 28, 2021

(65) Prior Publication Data

US 2023/0140069 A1 May 4, 2023

(51) Int. Cl.
*G06F 13/42* (2006.01)

(52) U.S. Cl.
CPC .. *G06F 13/4282* (2013.01); *G06F 2213/0026* (2013.01)

(58) Field of Classification Search
CPC .............. G06F 13/4282; G06F 2213/0026
See application file for complete search history.

(56) References Cited

U.S. PATENT DOCUMENTS

| | | | |
|---|---|---|---|
| 2006/0242354 A1* | 10/2006 | Johnsen | G06F 13/404 710/316 |
| 2012/0096192 A1* | 4/2012 | Tanaka | G06F 13/385 710/20 |
| 2016/0267035 A1* | 9/2016 | Murphy | G06F 13/368 |
| 2020/0192798 A1* | 6/2020 | Natu | G06F 12/12 |
| 2021/0173805 A1* | 6/2021 | Hayashi | G06F 13/105 |
| 2021/0250285 A1* | 8/2021 | Noureddine | H04L 12/40013 |
| 2022/0019551 A1* | 1/2022 | Baba | G06F 12/06 |
| 2022/0180009 A1* | 6/2022 | Remezov | G06F 12/14 |

\* cited by examiner

*Primary Examiner* — Henry Tsai
*Assistant Examiner* — Harry Z Wang
(74) *Attorney, Agent, or Firm* — NIXON & VANDERHYE P.C.

(57) ABSTRACT

A data processing apparatus is provided that includes communication circuitry to transmit an interconnect message to a root port using a physical address mapped to the root port. Translation circuitry encapsulates, within the interconnect message to the root port, a Peripheral Component Interconnect Express (PCIe) message to a destination, the PCIe message having routing information encoded as a PCIe bus number associated with the destination.

10 Claims, 5 Drawing Sheets

US 11,803,506 B2

PCIE ROUTING

TECHNICAL FIELD

The present disclosure relates to data processing.

DESCRIPTION

Messages can be routed in a Peripheral Component Interconnect Express (PCIe) network by providing routing information including the bus number to which a destination device is linked. This form of routing is often relied on for the transmission of certain types of messages. However, it traditionally does not work in a system where routing is based on physical addresses. When a packet has to cross through a system which has routing based on physical addresses to travel from a PCIe requestor to another PCIe requestor, the bus number based routing information is not sufficient.

SUMMARY

Viewed from a first example configuration there is provided a data processing apparatus comprising: communication circuitry configured to transmit an interconnect message to a root port using a physical address mapped to the root port; and translation circuitry configured to encapsulate, within the interconnect message to the root port, a Peripheral Component Interconnect Express (PCIe) message to a destination, the PCIe message having routing information encoded as a PCIe bus number associated with the destination.

Viewed from a second example configuration there is provided a method of data processing comprising: encapsulating, within an interconnect message to a root port, a Peripheral Component Interconnect Express (PCIe) message to a destination, the PCIe message having routing information encoded as a PCIe bus number associated with the destination; and transmitting the interconnect message to the root port using a physical address mapped to the root port Viewed from a third example configuration there is provided a non-transitory computer-readable medium to store computer-readable code for fabrication of a data processing apparatus comprising: communication circuitry configured to transmit an interconnect message to a root port using a physical address mapped to the root port; and translation circuitry configured to encapsulate, within the interconnect message to the root port, a Peripheral Component Interconnect Express (PCIe) message to a destination, the PCIe message having routing information encoded as a PCIe bus number associated with the destination.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
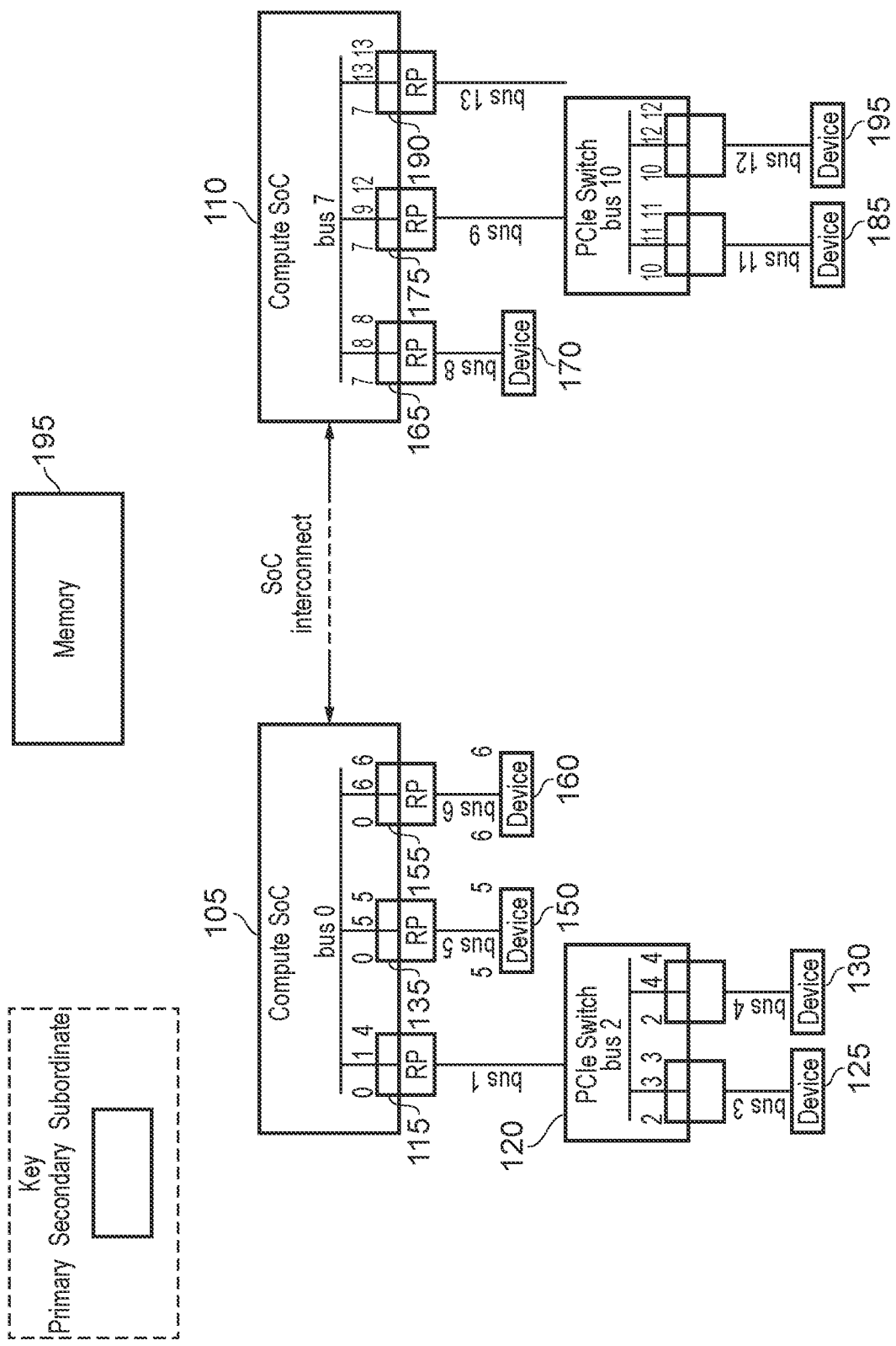
FIG. 1 shows a pair of compute SoCs connected via an SoC interconnect.

Before discussing the embodiments with reference to the accompanying figures, the following description of embodiments is provided.

In accordance with one example configuration there is provided a data processing apparatus comprising: communication circuitry configured to transmit an interconnect message to a root port using a physical address mapped to the root port; and translation circuitry configured to encapsulate, within the interconnect message to the root port, a Peripheral Component Interconnect Express (PCIe) message to a destination, the PCIe message having routing information encoded as a PCIe bus number associated with the destination.

The data processing apparatus interacts with the interconnect using physical addresses (e.g. physical addresses of memory mapped to the root port to which communications can be read and/or written by the root port). By providing a physical address of a root port, the interconnect message can be transmitted to the root port through an intra-chip/inter-chip interconnect. However, the PCIe message that is to be transmitted to the destination is one that uses a PCIe bus as its routing information (i.e. in order to determine the destination of the PCIe message). The translation circuitry therefore maps the destination PCIe bus to a physical address mapped to a root port, which has the destination function as part of its PCIe hierarchy and encapsulates the PCIe message within an inter/intra SoC interconnect message to the root port. From there, the root port is able to transmit the PCIe message to its intended destination. In this way, the PCIe message (which routes according to PCIe bus numbers) is able to be transmitted to its destination through a network that utilises physical addressing. Consequently, where a peer-to-peer path would take the PCIe message through inter-chip and/or intra-chip interconnection networks to reach the destination (e.g. through root ports), the message can still be routed correctly. The routing information can be comprised within the PCIe message by being encoded as the PCIe bus number associated with the target/destination.

In some examples, the translation circuitry storage comprises: root port lookup circuitry to store correspondences between identifiers of root ports and PCIe buses; and address lookup circuitry to store correspondences between root ports and physical addresses. The translation process can therefore be a two-stage process. In a first stage, a root port (e.g. a target root port) is determined for the destination bus to which the PCIe message is to be transmitted. Then, in a second stage, the physical address associated (e.g. mapped to) with that root port is determined. This physical address is used as the address in the intra-chip/inter-chip interconnect message that encapsulates the PCIe message.

In some examples, the root port lookup circuitry comprises, for each of the root ports, a secondary bus number and a subordinate bus number that identifies the highest secondary bus number that is assigned to a link downstream of the root port. The bus numbers are assigned at startup during enumeration process and these numbers may be altered over time in response to other devices joining the network. Each device is associated with and addressed by the bus number assigned to the PCIe link that connects the device to the PCIe fabric. The secondary bus number is the bus number assigned to a root port's or switch's own PCIe link. A subordinate bus number of a root port or a switch port accounts for all bus numbers assigned to links in its downstream hierarchy. For instance, if a root port is connected to a switch, which has two ports with secondary bus numbers 11 and 12, then the subordinate bus number of the root port is 12. The PCIe peripherals connected to the switch ports with secondary bus numbers 11 and 12 will consume any messages that target bus numbers 11 and 12 respectively. Note that the IDs in these systems are assigned in a depth first order.

In some examples, the root port lookup circuitry is configured to identify the root port whose secondary bus number is less than or equal to the PCIe bus number and whose subordinate bus number is greater than or equal to the PCIe bus number. Since the bus numbers are assigned in a depth-wise fashion, a root port is responsible for routing messages to any device (switch, peripheral, etc.) that falls within the range of the root port's own secondary bus number and the subordinate bus number. Therefore, if the bus number of a destination lies between these two numbers associated with a particular port then that destination is the place to which the interconnect message containing the PCIe message should be transmitted.

In some examples, in response to the interconnect message, the root port lookup circuitry is configured to check the secondary bus number and the subordinate bus number of each of the root ports against the PCIe bus number in parallel. By checking in parallel, the identity of the corresponding root port can be provided more quickly than a system in which the root ports are checked sequentially. The check could be carried out in response to receiving the interconnect message or, if the interconnect message is generated, in response to the message being generated for instance.

In some examples, in response to the PCIe message, the translation circuitry is configured to look up an identifier of the root port using the root port lookup circuitry and then to look up the physical address mapped to the identifier of the root port using the address lookup circuitry. The use of the root port ID to identify the physical address therefore follows the identification of the destination root port that is necessary to communicate with the destination of the PCIe message. The looking up of the identifier could occur, for instance, when the PCIe message has been generated or when it is about to be generated.

In some examples, the communication circuitry is configured to write the interconnect message to the physical address in a memory; and the physical address in the memory is accessible to the root port. The memory in question could, for instance, be a memory within the root port itself. However, in other examples, other shared memories could be used.

In some examples, the PCIe message is a PCIe peer-to-peer message. In a PCIe peer-to-peer system, PCIe devices can transfer data with each other directly rather than being requires to exchange messages using a shared memory. Peer-to-peer communication can be achieved quickly and with low latency because only one write/read occurs rather than two when a shared memory is provided. However, peer-to-peer message communication will not work when the message specifies the destination using the target's bus number and the message has to cross through an intra-chip/inter-chip interconnect which has routing based on physical addresses.

In some examples, the routing information comprises a device number associated with the destination; and the routing information comprises a function number associated with the destination. The routing information can therefore be a tuple including {the bus number, the device number, the function number}. The bus number indicates the bus on which the destination device lies. The device number identifies the destination device. Function numbers can be used to 'virtualise' physical devices—thereby making it possible for a single peripheral to be shared among a number of other devices. The tuple therefore makes it possible to route a message to the correct bus, then the correct physical device, and then the correct virtual device. However, such routing techniques are not usable in a network were communication takes place using physical addresses.

In some examples, the interconnect message is a Vendor Defined Message (VDM). VDMs can be used, for instance, to provide firmware updates to PCIe devices. However, VDMs are often required to be implemented using peer-to-peer routing using the PCIe bus number of a target PCIe device. The present technique therefore makes it possible for such messages to be transmitted by making use of the interconnect message, which proceeds without the use of peer-to-peer routing.

In some examples, the Peripheral Component Interconnect Express network is a Compute Express Link (CXL) network. The term 'PCIe' is therefore intended to cover networks, standards, and techniques that are built on top of PCIe.

Particular embodiments will now be described with reference to the figures.

FIG. 1 illustrates a system 100 containing a first compute system-on-chip (SoC) 105 and a second compute system-on-chip (SoC) 110 in communication with each other via an SoC interconnect. The system contains a number of PCIe devices 125, 130, 150, 160, 170, 185, 195. The devices 125, 130, 150, 160, 170, 185, 195 connect to the compute SOCs 105, 110 via root ports 115, 135, 155, 165, 175, 190 (which are examples of the claimed data processing apparatus) and/or PCIe switches 120, 140. Some of the devices 125, 130 are connected to a root port 115 via a PCIe switch 120. In other cases, a device 150 is directly connected to the root port 135.

In such a system 100, communication typically occurs from one device 125 to another device 170 by using software—either as a consumer or as an intermediary. For instance, the device 125 may write the message into a page (e.g. a 16 kB page) of shared memory 195 and then inform the software. The software would then inform the receiving device 170 that it should read the data. This software handshaking can be avoided if device 120 sends a message that targets a physical address mapped to the destination device 170. Such a message will be routed correctly from root port 115 to root port 116 through the system interconnect because the message uses a physical address to specify the target.

One particular type of message that may be transmitted within such a system 100 is a vendor defined message (VDM). Such a message can be used where a baseboard management controller (BMC) performs a firmware update of a PCIe device using VDMs. In this situation, the BMC 125 uses its interface to directly send firmware to the device to be updated 170. VDMs expect to be transmitted using peer-to-peer techniques. With peer-to-peer communication, a first device 130 can transmit a message directly to a second device 150 without necessitating data being written to the shared memory 195. This is achieved by providing routing information in the form of a destination device identifier and, for instance, a PCIe bus responsible for the destination device and function number (which allows the physical device 150 to be 'split' and therefore shared). However, such techniques do not work where the packet has to transit through the intra-chip/inter-chip interconnect that uses the above-mentioned physical addressing. For instance, where the communication must travel from one compute SoC 105 to another compute SoC 110, bus number based peer-to-peer communication is typically not possible and routing instead proceeds via the use of destination's physical memory address.

The present technique makes it possible for VDMs to be transmitted in a system 100 such as that shown in FIG. 1, where routing is expected to occur using physical memory addresses.

Also shown in FIG. 1 are bus numbers that are assigned to PCIe links between PCIe devices, switches etc. Each PCIe switch downstream port and root port has three numbers illustrated in FIG. 1. The first number (the left number) is a "primary bus number", which is the identifier of a bus for which the switch or root port is a member (i.e. it is the identifier of an upstream link). The second number (the middle number) is a "secondary bus number" and is the bus number assigned to the downstream link of PCIe switch port, or root port in a depth-first ordering. The third number (the right number) is a "subordinate bus number" and is the highest secondary bus number of any device or switch in that port's downstream hierarchy. The root port or switch downstream port is responsible for forwarding messages that targets bus numbers that are between its secondary and subordinate bus numbers to the downstream hierarchy. Since a PCIe device would be connected to either a root port or to a switch downstream port via a PCIe link, the bus number for a PCIe device would be the secondary bus number of the root port or switch port to which it is attached. For instance, a root port 175 may have a secondary bus number of 7 and a subordinate bus number of 10. The subordinate bus number of 10 indicates that the highest secondary bus number for which the root port 175 is responsible is 10. As illustrated in FIG. 1, the root port 175 does indeed have responsibility for a device 185 that is connected to a bus with an ID of 9 and also for a device 195 that is connected to a bus with an ID of 10.

The secondary bus numbers are established in a process known as enumeration, which can occur when the system 100 is started up for the first time. The addition of new devices to the system 100 can cause the bus numbers to change.

Note that although FIG. 1 illustrates an SoC-to-SoC interconnect (an inter-SoC interconnect), the present technique also or alternatively allows transport over intra-SoC interconnect (which connects different root ports within the same SoC die or root ports in different dies inside a package).

Figure 2:
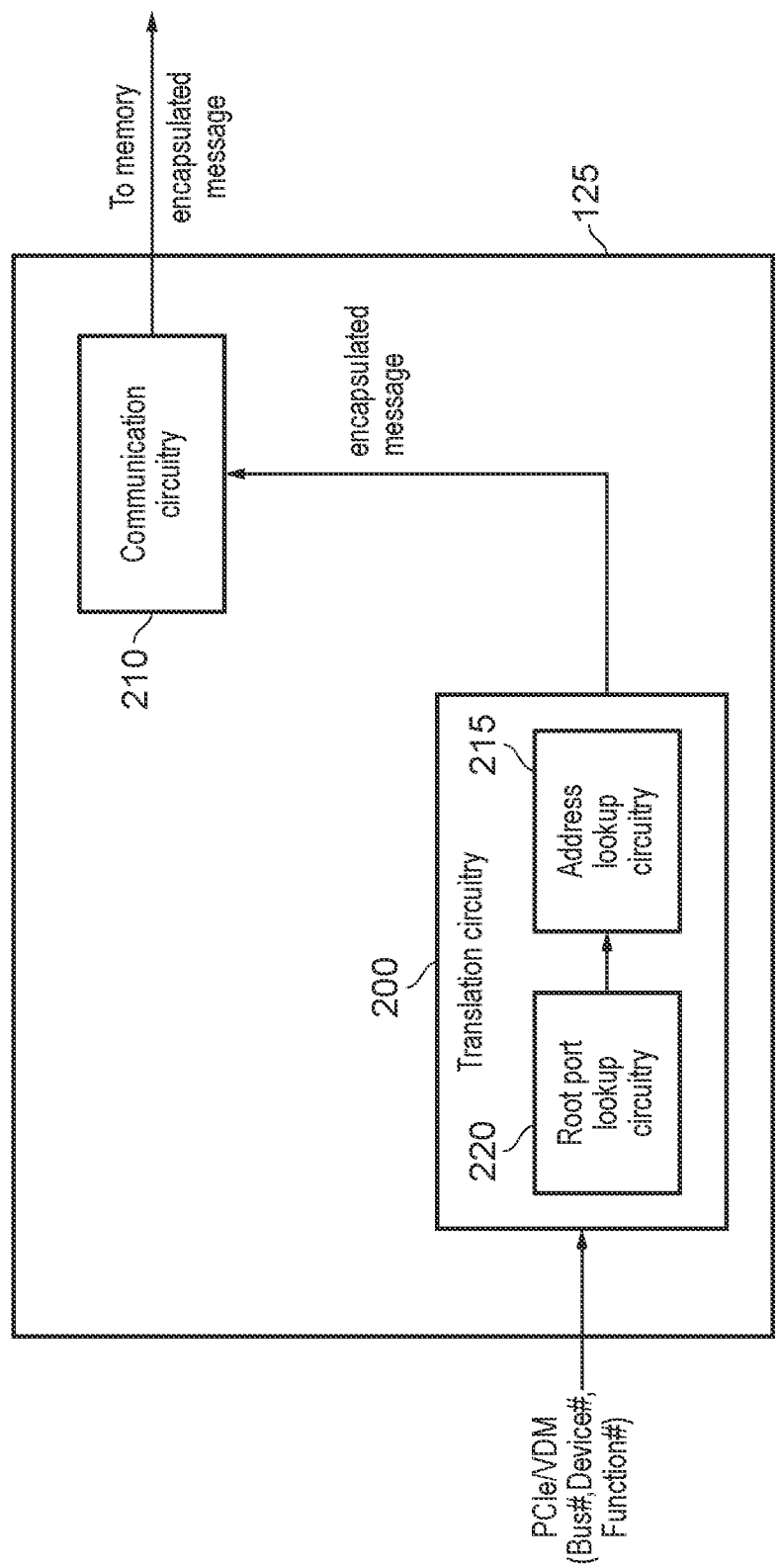
FIG. 2 illustrates a PCIe device in more detail.

FIG. 2 illustrates a device 125 in more detail. In this example, a VDM is received by translation circuitry 200. The VDM could be received from another device or the VDM could be generated by the device 125 itself.

In any event, the translation circuitry 200 is responsible for encapsulating the VDM/PCIe message into an interconnect message that is suitable for transmission within the system 100 (i.e. using address-based routing). The translation circuitry 200 contains two components.

The first component is a root port lookup circuit 220, which is responsible for determining the identity of the root port to which the VDM should be transmitted.

The second component is address lookup circuitry 215, which is responsible for determining a memory address of a memory in the root port that has been identified by the root port lookup circuitry 220.

Once the translation circuitry 200 has produced the encapsulated message, communication circuitry 210 is responsible for transmitting the encapsulated message to the memory of the root port. This can be achieved by a memory write operation to the address that has been determined using the address lookup circuitry 215. In this way, the encapsulated interconnect message is transmitted to a root port that is responsible for the destination device specified by the VDM. Once the encapsulated interconnect message is received by the responsible root port 145, the VDM can be delivered using the routing data included within the VDM (the PCIe bus number, device number, and function number).

Figure 3:
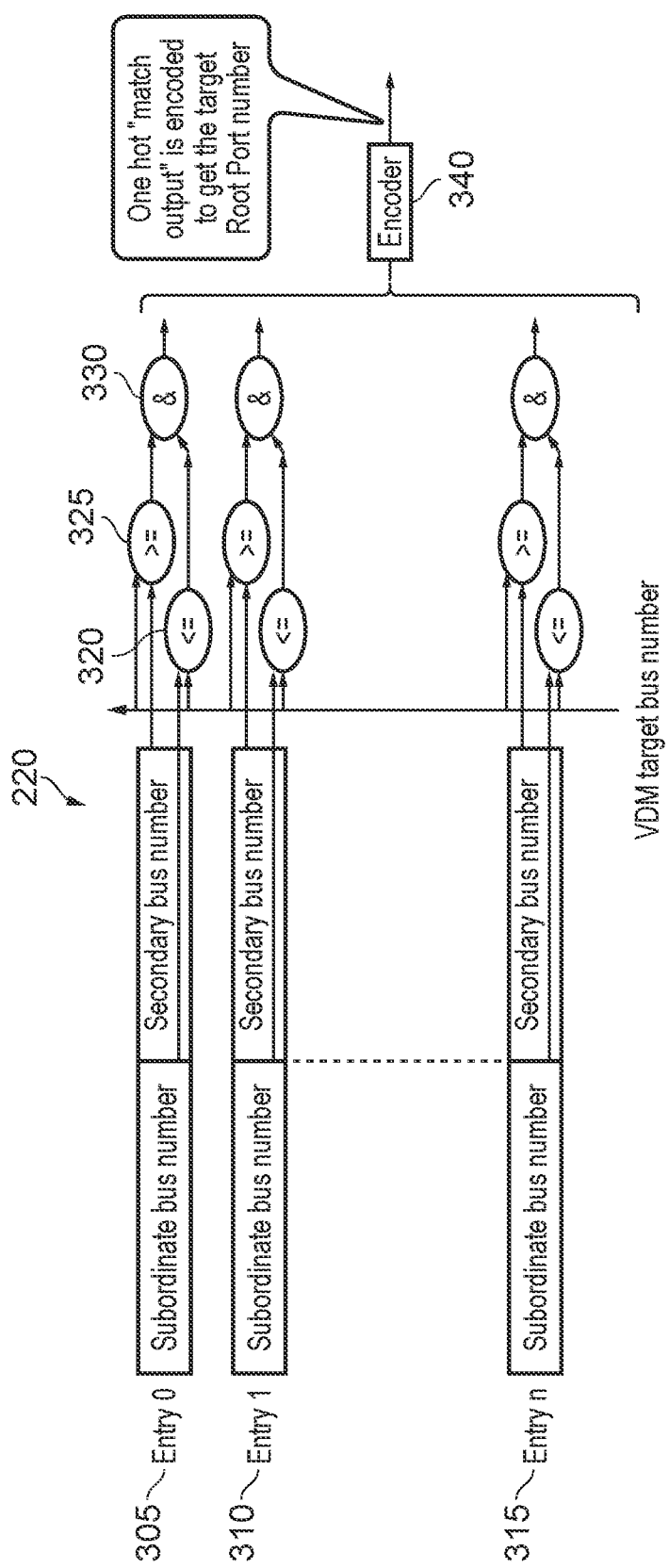
FIG. 3 shows an example of root port lookup circuitry.

FIG. 3 illustrates an example of the root port lookup circuitry 220, which is responsible for determining the root port as that is responsible for a particular device. A number of entries 305, 310, 315 are contained within the lookup circuitry 220. In this example, each of the entries can be looked up in parallel. Each entry contains a subordinate bus number and a secondary bus number associated with a particular root port. In each case, the lookup circuitry 220 determines whether the target bus number specified in the VDM is less than or equal to the subordinate bus number of an entry and greater than or equal to the secondary bus number of that entry. This can be achieved by means of a less than or equal to comparator 320, a greater than or equal to comparator 325, and a logical AND gate 330. In each case, each entry 305, 310, 315 outputs either a '0' if both the conditions are not met or a '1' if either condition is not met.

These outputs can then be combined by an encoder 340 into a one-hot encoding that identifies the root port that is responsible for receiving the VDM. That is to say that one of the bits of the data output by the encoder 340 is a '1' and other bits are '0'. Of course, other encodings may also be possible such as a one-cold encoding.

There are a number of ways in which the entries 305, 310, 315 of the root port lookup circuitry 220 can be populated. However, in some examples, these entries are populated during the enumeration phase. Repopulation of the entries 305, 310, 315 may occur in response to a new device joining the network 100 since this may involve a reallocation of bus numbers.

Figure 4:
FIG. 4 shows an example of address lookup circuitry.

FIG. 4 illustrates an example of address lookup circuitry 215. The address lookup circuitry 215 receives, for instance, a one-hot output produced by the encoder 340 of the root port lookup circuitry 220. The data produced by the encoder 340 of the root port lookup circuitry 220 indicates the root port to which the VDM is to be transmitted. From here, it is possible to index into the address lookup circuitry 215 to identify the address of the page of the memory 195 associated with that root port. For instance, if the encoder 340 were to produce an encoding of '0010000', this would indicate that the third root port/address in the table 215 was to be used. In this case, such identifier would indicate the address 0x111FBC00, which would therefore be the page of memory to be written to in order to communicate with the third root port (likely root port 145).

Having identified the address to use to communicate with the root port, the VDM message can be written to the relevant page of memory for that root port. Once the write is complete, the destination side root port will be able to read the VDM and route it to the destination device using the routing information contained within the VDM (the PCIe bus number, device number, and function number)

Figure 5:
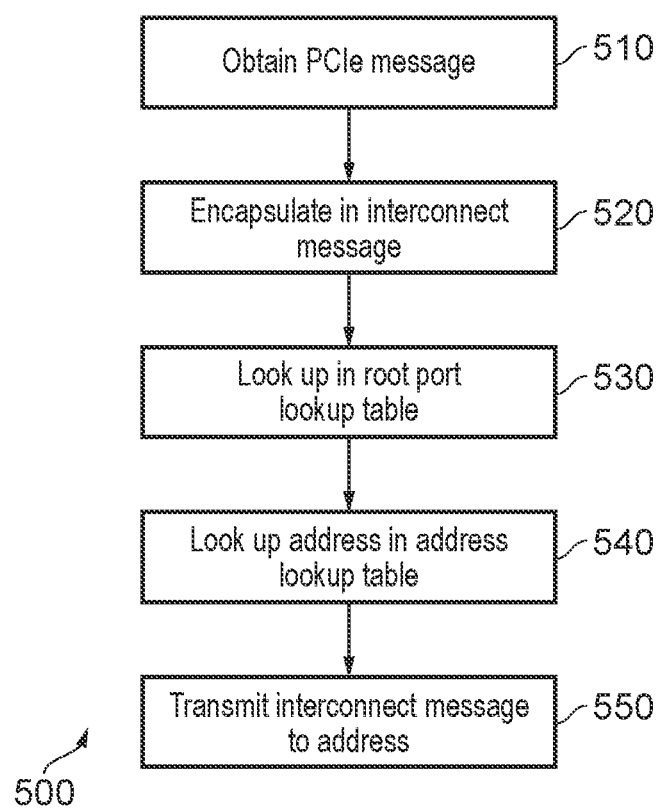
FIG. 5 illustrates a flowchart that shows a method of routing for an SoC interconnect.

FIG. 5 illustrates a flowchart 504 that describes a process of transmitting VDM messages in a system 100 such as that shown in FIG. 1. As a step 510, the PCIe message (VDM) is obtained. At a step 520, the VDM (its header and its payload) is encapsulated within an interconnect message 520. This can be achieved using, for instance, translation circuitry 200 as previously described. At a step 530, an identity of the root port that corresponds with a bus number described in the VDM is determined. This can be achieved using the root port lookup circuitry 220 as previously described. At a step 540, an address associated with that root port is determined. This can be achieved using the address lookup circuitry 215 as previously described. Then, at a step 550, the generated interconnect message is transmitted by performing a write to the address that was established in step 514.

In accordance with the above, it is possible for a peer-to-peer message such as a VDM to be routed through an SoC interconnect (which routes using addresses).

Although the above description has referred to PCIe networks, the above technique is also applicable to other standards that are built on top of PCIe such as CXL In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
communication circuitry configured to transmit an interconnect message to a physical address mapped to a root port; and
translation circuitry configured to encapsulate, within the interconnect message to the root port, a Peripheral Component Interconnect Express (PCIe) message to a destination, the PCIe message having routing information encoded as a PCIe bus number associated with the destination, the translation circuitry comprising:
root port lookup circuitry to store correspondences between identifiers of root ports and PCIe buses; and
address lookup circuitry to store correspondences between root ports and physical addresses, wherein
the root port lookup circuitry comprises, for each of the root ports, a secondary bus number that identifies the root port and a subordinate bus number that identifies the highest secondary bus number of any device for which the root port is responsible;
the root port lookup circuitry is configured to identify the root port whose secondary bus number is less than or equal to the PCIe bus number and whose subordinate bus number is greater than or equal to the PCIe bus number; and
in response to the interconnect message, the root port lookup circuitry is configured to check the secondary bus number and the subordinate bus number of each of the root ports against the PCIe bus number in parallel.

2. The data processing apparatus according to claim 1, wherein
in response to the PCIe message, the translation circuitry is configured to look up an identifier of the root port using the root port lookup circuitry and then to look up the physical address mapped to the identifier of the root port using the address lookup circuitry.

3. The data processing apparatus according to claim 1, wherein
the communication circuitry is configured to write the interconnect message to the physical address in a memory; and
the physical address in the memory is accessible to the root port.

4. The data processing apparatus according to claim 3, wherein
the memory is a memory of the root port.

5. The data processing apparatus according to claim 1, wherein
the PCIe message is a PCIe peer-to-peer message.

6. The data processing apparatus according to claim 1, wherein
the routing information comprises a device number associated with the destination; and
the routing information comprises a function number associated with the destination.

7. The data processing apparatus according to claim 1, wherein
the interconnect message is a Vendor Defined Message (VDM).

8. The data processing apparatus according to claim 1, wherein
the Peripheral Component Interconnect Express network is a Compute Express Link (CXL) network.

9. A method of data processing comprising:
encapsulating, within an interconnect message to a root port, a Peripheral Component Interconnect Express (PCIe) message to a destination, the PCIe message having routing information encoded as a PCIe bus number associated with the destination; and
transmitting the interconnect message to a physical address mapped to the root port;
storing correspondences between identifiers of root ports and PCIe buses, wherein for each of the root ports, a secondary bus number is stored that identifies the root port and a subordinate bus number is stored that identifies the highest secondary bus number of any device for which the root port is responsible;
storing correspondences between root ports and physical addresses;
identifying the root port whose secondary bus number is less than or equal to the PCIe bus number and whose subordinate bus number is greater than or equal to the PCIe bus number; and
in response to the interconnect message, the secondary bus number and the subordinate bus number of each of the root ports is checked against the PCIe bus number in parallel.

10. A non-transitory computer-readable medium to store computer-readable code for fabrication of a data processing apparatus comprising:
communication circuitry configured to transmit an interconnect message to a physical address mapped to the root port; and
translation circuitry configured to encapsulate, within the interconnect message to the root port, a Peripheral Component Interconnect Express (PCIe) message to a destination, the PCIe message having routing information encoded as a PCIe bus number associated with the destination, the translation circuitry comprising:
root port lookup circuitry to store correspondences between identifiers of root ports and PCIe buses; and
address lookup circuitry to store correspondences between root ports and physical addresses, wherein
the root port lookup circuitry comprises, for each of the root ports, a secondary bus number that identifies the root port and a subordinate bus number that identifies the highest secondary bus number of any device for which the root port is responsible;
the root port lookup circuitry is configured to identify the root port whose secondary bus number is less than or equal to the PCIe bus number and whose subordinate bus number is greater than or equal to the PCIe bus number; and
in response to the interconnect message, the root port lookup circuitry is configured to check the secondary bus number and the subordinate bus number of each of the root ports against the PCIe bus number in parallel.

* * * * *